(12) United States Patent
Jackson, III

(10) Patent No.: US 7,156,692 B2
(45) Date of Patent: Jan. 2, 2007

(54) EYE GROUNDING CONTROLLER

(76) Inventor: Denton L. Jackson, III, 9184 Highway 51, Coldwater, MS (US) 38618

( * ) Notice: Subject to any disclaimer, the term of this patent is extended or adjusted under 35 U.S.C. 154(b) by 0 days.

(21) Appl. No.: 11/340,247

(22) Filed: Jan. 26, 2006

(65) Prior Publication Data
US 2006/0189203 A1   Aug. 24, 2006

Related U.S. Application Data

(63) Continuation-in-part of application No. 10/767,313, filed on Jan. 29, 2004, now Pat. No. 7,029,316.

(51) Int. Cl.
H01R 13/00 (2006.01)
(52) U.S. Cl. .................... 439/477; 174/40 R
(58) Field of Classification Search ............. 439/477, 439/478; 361/652, 673; 174/68, 72, 71 B
See application file for complete search history.

(56) References Cited

U.S. PATENT DOCUMENTS

| | | | |
|---|---|---|---|
| 2,145,164 A * | 1/1939 | Douglas | 439/569 |
| 2,650,286 A * | 8/1953 | Ramos | 200/246 |
| 3,923,363 A * | 12/1975 | Kraft | 439/413 |
| 4,178,470 A * | 12/1979 | Jean et al. | 174/168 |
| 4,741,704 A * | 5/1988 | DeLuca | 439/92 |
| 5,011,421 A * | 4/1991 | Duke et al. | 439/213 |
| 5,515,236 A * | 5/1996 | Nolan et al. | 361/652 |
| 6,043,433 A * | 3/2000 | Schweitzer, Jr. | 174/70 R |
| 6,096,970 A * | 8/2000 | Katoh et al. | 174/40 CC |
| 6,603,075 B1 * | 8/2003 | Soares et al. | 174/72 B |
| 2002/0177353 A1 * | 11/2002 | De France | 439/477 |
| 2004/0173436 A1 * | 9/2004 | Baker | 198/370.08 |

* cited by examiner

*Primary Examiner*—Tulsidas C. Patel
*Assistant Examiner*—Phuongchi Nguyen
(74) *Attorney, Agent, or Firm*—Charles F. Rye

(57) ABSTRACT

A lifting and anti torque lifting means to be attached to a clamp or other end termination of a temporary conductor. In power distribution services the most common use of such a temporary conductor is a grounding set which is used to provide a conductive path between power lines as a safety ground. The lifting means may be a separate retro fit assembly or may be made integral with grounding clamps or other end terminations. The lifting means allows the grounding clamp to be lifted into position with relatively light extendable long reach poles commonly used by lineman. The anti torque feature helps resist the tendency for the end terminations to cam off the line or other object the clamp has been placed on while the clamp is closed or opened. A second hook attached to the conductor proximate to a first end termination cooperates with a first hook of the lifting means in order to hang other end terminations of the conductor set. These features increases convenience and safety by having the second end termination controlled and proximate to the first end termination while lifting and positioning the first end. A key hole slot at the top of the aperture helps keep the assembly on a ball end L hook commonly used by lineman on extension sticks. Another variation is a L slot connected to the aperture which allows a downward pull to be exerted to lock spring type jaw end terminations and helps secure the assemble on the extension stick.

18 Claims, 5 Drawing Sheets

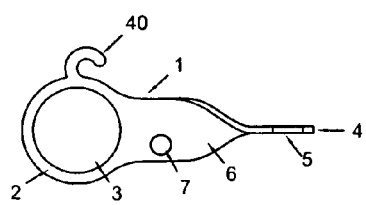
FIG. 1
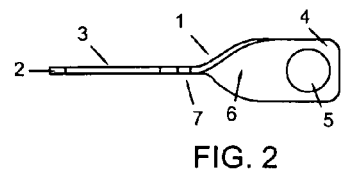
FIG. 2
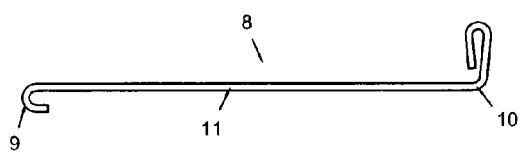
FIG. 3
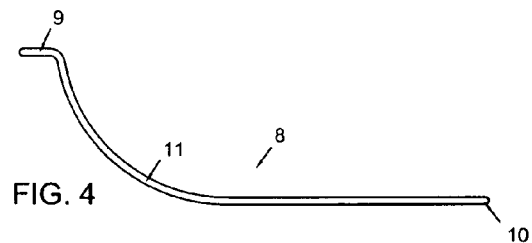
FIG. 4
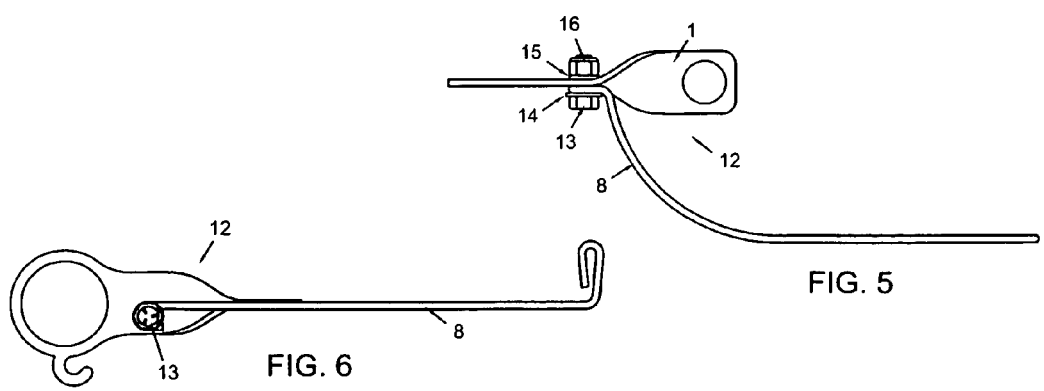
FIG. 5
FIG. 6

EYE GROUNDING CONTROLLER

Continuation in part of application Ser. No. 10/767,313 filed on Jan. 29, 2004 now U.S. Pat. No. 7,029,316.

THIS INVENTION DID NOT INVOLVE ANY FEDERAL SPONSORSHIP

BACKGROUND OF THE INVENTION

This invention relates to providing a means to lift a temporary conductor into place and reducing the end terminations tendency to cam off the intended position while the clamping means of the temporary conductor is closed or opened. This invention also provides for the use of a common extendable stick that can be practically used for long reaches and especially to reach from the ground. The most common use of a temporary conductor in power distribution maintenance is safety grounding power lines together with a grounding set. Current practices include the use of Shot Gun Stick™ which attaches to the screw portion of a clamp of the grounding set to lift and place it on a power line. The weight of the means used to lift the grounding set and the limitation of the practical reach length generally requires the lineman to climb the power pole use a lift on a truck. A first hook on the means to lift in cooperation with a hook attached to the conductor allow other end terminations to be controlled proximate to the end termination being lifted, positioned and actuated. The aperture which receives the manipulating means has a slot feature to receive an arm that provides a key hole attachment in relation to the normal larger diameter or ball end to further secure the assembly to the lifting means. When used in conjunction with spring actuated jaw type end terminations another variation has an L slot to allow downward pull to be exerted to secure the jaw on a line or other conductor.

U.S. Pat. No. 1,712,067 filed by Bodendieck in 1926 is an early example of a clamp for a temporary conductor used in power transmission services. 067 does provide a ring to lift the clamp into place but does not provide an effective means to resist camming off the placement when the screw is manipulated.

U.S. Pat. No. 1,949,646 filed by Dibner in 1928 details a modification to the screw of the clamp however it requires a special end attachment to the lifting pole. The connection of the pole to the clamp requires a precise alignment which would be awkward if the clamp moves out of its original alignment relative to the position it was installed.

U.S. Pat. No. 1,934,126 filed by Johnson in 1926 also provides a unique method to attach a lifting pole to the clamp. Likewise it requires a special end attachment for the lifting pole and any shift in the position of the clamp from its original position would greatly increase the difficulty of reattaching the pole to unclamp. The position of the clamp could be effected by the weight of the grounding set in a twisting action on power line it is attached to.

U.S. Pat. No. 2,009,289 filed by Caird in 1932 attempted to provide stability to the clamp by use of spring action against the power line while the clamp is being manipulated. The spring extending on both sides would only provide its maximum resistance to camming off just before the clamp jaw actually seats against the power line. This design does not appear in currently available grounding sets.

U.S. Pat. No. 2,095,137 filed by Johnson in 1935 again requires a specialized lifting pole. The exposed hook may have allowed greater misalignment of the clamp from its original position. However the entire lifting pole is part of the mechanism which does not tend to lend itself to adjustable length and would probably be too heavy for long reaches.

SUMMARY OF THE INVENTION

This invention preferred embodiment is a bracket assembly that is adapted to be retro fitted onto clamps of grounding sets to provide an eye to lift the grounding set by and an anti-torque arm to resist the natural tendency of the clamp to cam off a power line while the clamp screw is being turned. The eye and the anti-torque arm may be incorporated into the clamp design in its original production. The hook on the eye in combination with a second hook attached to the conductor allows additional end terminations to be hung proximate to the first clamp for convenience and safety while lifting and positioning the temporary conductor. The aperture which receives the manipulating means has a slot feature to receive an arm that provides a key hole attachment in relation to the normal larger diameter or ball end to further secure the assembly to the lifting means. When used in conjunction with spring actuated jaw type end terminations another variation has an L slot to allow downward pull to be exerted to secure the jaw on a line or other conductor.

This inventions greatest benefit is realized by allowing the use of a lightweight pole to position a grounding set on a power line by a lineman from the ground level. Grounding set as used by lineman in maintenance of power distribution system consists of an assembly of at least one length of flexible cable and a termination at each end. The end terminations usually consist of an adapted C clamp which can be placed over a power and closed on it to provide a conductive path. It is a very critical safety procedure to ground power lines when work being preformed requires the lineman to come in contact with or in close proximity to power lines which generally are bare. The grounding set may have end terminations specially adapted to attach to objects other than power lines.

The ability to lift, place and manipulate the clamping means of a grounding set on a power line from ground level allows the lineman to ground power lines in remote areas difficult to move a truck to and the lineman may be able to avoid climbing damaged poles would greatly enhance safety. It is therefore the most important object of this invention to provide a resistance to the tendency of the clamp to cam off the power line and accommodate the use a light long reach extension stick for positioning and manipulating the clamps of grounding sets. The invention may be adapted to specialized ground set terminations for unique attach points.

BRIEF DESCRIPTION OF THE DRAWINGS

FIG. 1 is a side view of the bracket body;

FIG. 2 is a top view of the bracket body;

FIG. 3 is a side view of the anti torque arm;

FIG. 4 is a top view of the anti-torque arm;

FIG. 5 is a side view of the bracket assembly;

FIG. 6 is a top view of the bracket assembly;

DETAILED DESCRIPTION OF THE DRAWINGS

Figure 11:
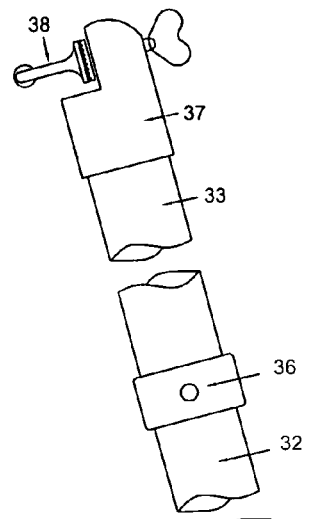
FIG. 11 is a side view of an extension stick.

FIG. 1 shows a side view of the bracket body 1. The first aperture 3 is located in first end 2 and is adaptive to receive L hook 38 (FIG. 11) of an extension stick 29 (FIG. 11). The second aperture 5 is located in the second end 4 and is adaptive to receive the cable bolt 25 (FIG. 6). The third aperture 7 is adaptive to receive bolt 13 (FIG. 5). Middle region 6 is formed to index first end 2 approximately ninety degrees relative to second end 4. The first hook 40 is shown at the top of first end 2.

FIG. 2 shows a top view of the bracket body 1. The respective features 2 through 7 are also shown.

Figure 7:
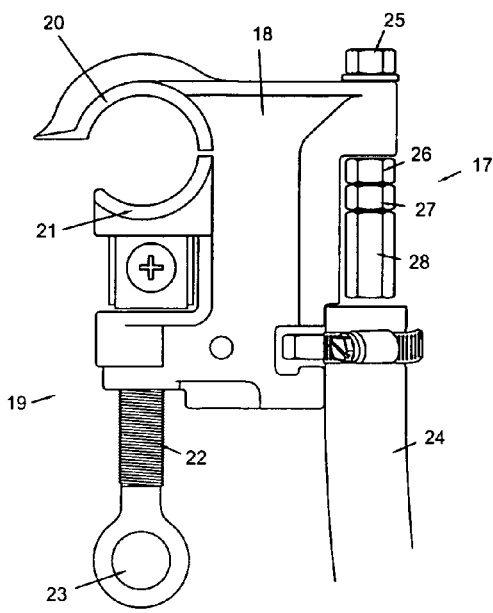
FIG. 7 is a side view of a ground set clamp.
Figure 15:
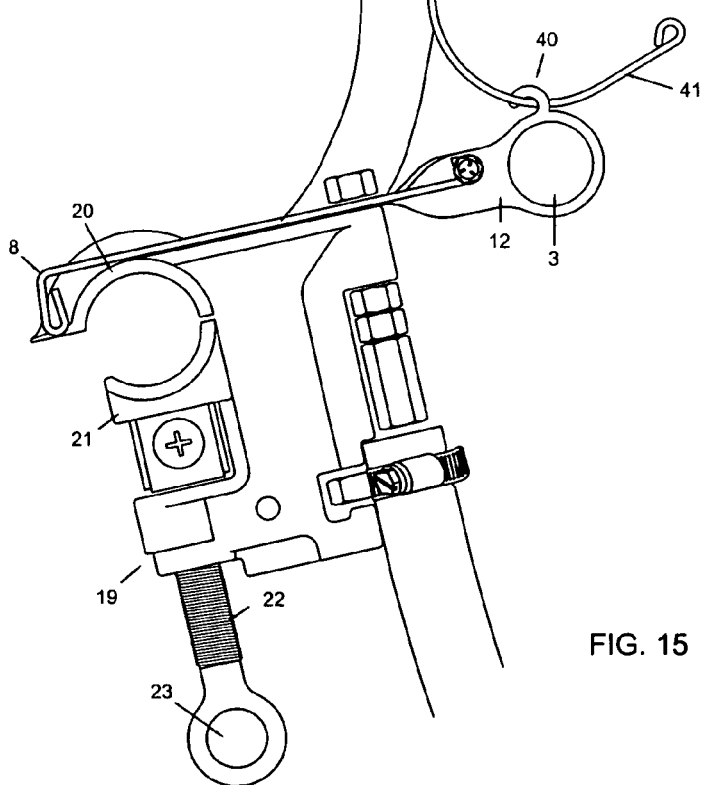
FIG. 15 is a side view of a grounding set clamp attached to a power line with a L hook attachment on a extension stick engaged in the eye of an Eye Grounding bracket with the second grounding set clamp hung on the second hook proximate to the grounding set clamp being lifted.

FIG. 3 shows a side view of anti-torque arm 8. The arm first end 9 is formed to receive bolt 13 (FIG. 5). The arm second end 10 is formed to engage power line 39 (FIG. 15). The arm length 11 is formed to extend arm second end 10 away from clamp body 19 (FIG. 7) and in line with fixed jaw 20 (FIG. 7).

FIG. 4 shows a top view of anti-torque arm 8. The respective features 9 through 11 are also shown.

FIG. 5 shows a side view of bracket assembly 12. Bolt 13 passes through flat washer 14, anti-torque arm 8, and lock washer 15. Nut 16 is fastened to bolt 13.

FIG. 6 shows a top view of bracket assembly 12. The respective features 13 through 16 are also shown.

FIG. 7 shows a side view of one clamp 19 of grounding set 17 which has major components of clamp 19 and cable 24 and another clamp 19 at the other end of cable 24. The length of cable 24 and another clamp 19 are omitted from the figure as redundant. Screw eye 23 is rotated to advance or retract screw 22 which acts on movable jaw 21. Fixed jaw 20 is an integral part of clamp body 19 which also accepts cable bolt 25. Cable bolt 25 is held in position in clamp body 19 by lock nut 26. Cable end fitting 28 is screwed on to cable bolt 25 and is secured by holding nut 27.

Figure 8:
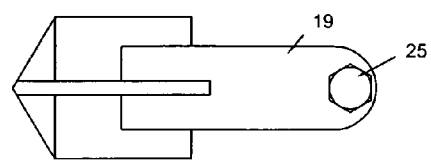
FIG. 8 is a top view of a ground set clamp.

FIG. 8 shows a top view of clamp 19 and cable bolt 25.

Figure 9:
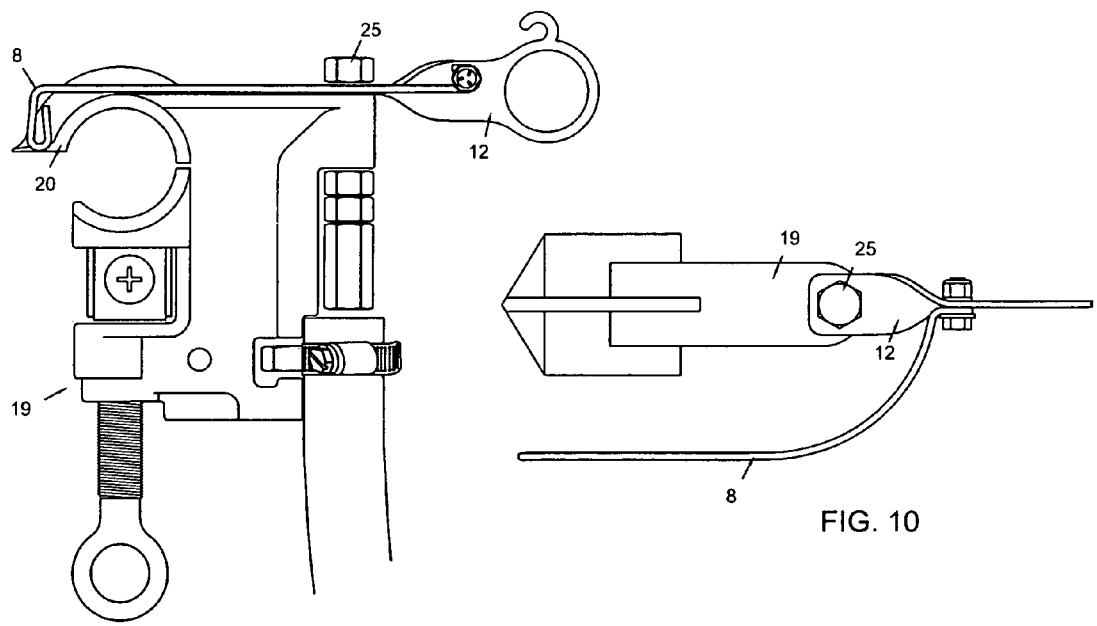
FIG. 9 is a side view of bracket assembly attached to a grounding set clamp.

FIG. 9 shows a top view of bracket assembly 12 attached to clamp 19 by cable bolt 25. Anti-torque arm 8 is aligned with fixed jaw 20.

Figure 10:
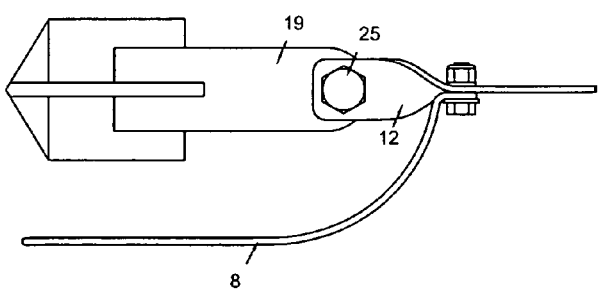
FIG. 10 is a top view of bracket assemby attached to grounding set clamp.

FIG. 10 shows a side view of bracket assembly 12 attached to clamp 19. Anti-torque arm 8 extends away from clamp 19.

FIG. 11 shows a side view of extension stick 29. Stick joint 30, 31, 32 and 33 are extended and locked into place by lock 34, 35 and 36 respectively. Manipulating end 37 has attachment L hook 38 fitted to it.

Figure 12:
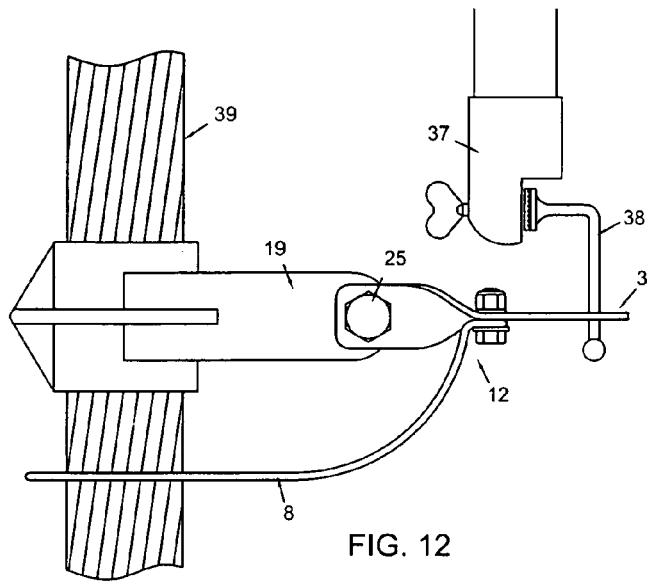
FIG. 12 is a top view of a grounding set clamp attached to a power line with a L hook attachment on an extension stick engaged in the eye of an Eye Grounding bracket.

FIG. 12 shows a top view of clamp 19 positioned on power line 39. Anti-torque arm 8 engages power line 39. L hook 38 engages first aperture 3 of bracket assembly 12 which allows grounding set 17 (FIG. 7) to be lifted by the manipulating end 37 of extension stick 29.

Figure 13:
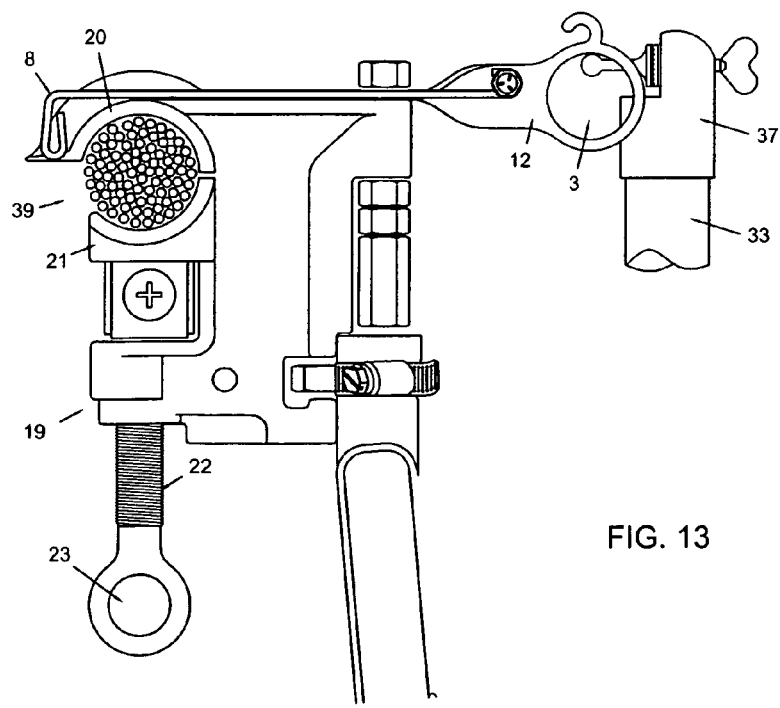
FIG. 13 is a top view of a grounding set clamp attached to a power line with a L hook attachment on an extension stick engaged in the eye of an Eye Grounding bracket.

FIG. 13 shows a side view of clamp 19 positioned on power line 39. Anti-torque arm 8 engages power line 39. L hook 38 engages first aperture 3 of bracket assembly 12 which allows grounding set 17 (FIG. 7) to be lifted by the manipulating end 37 of extension stick 29.

Figure 14:
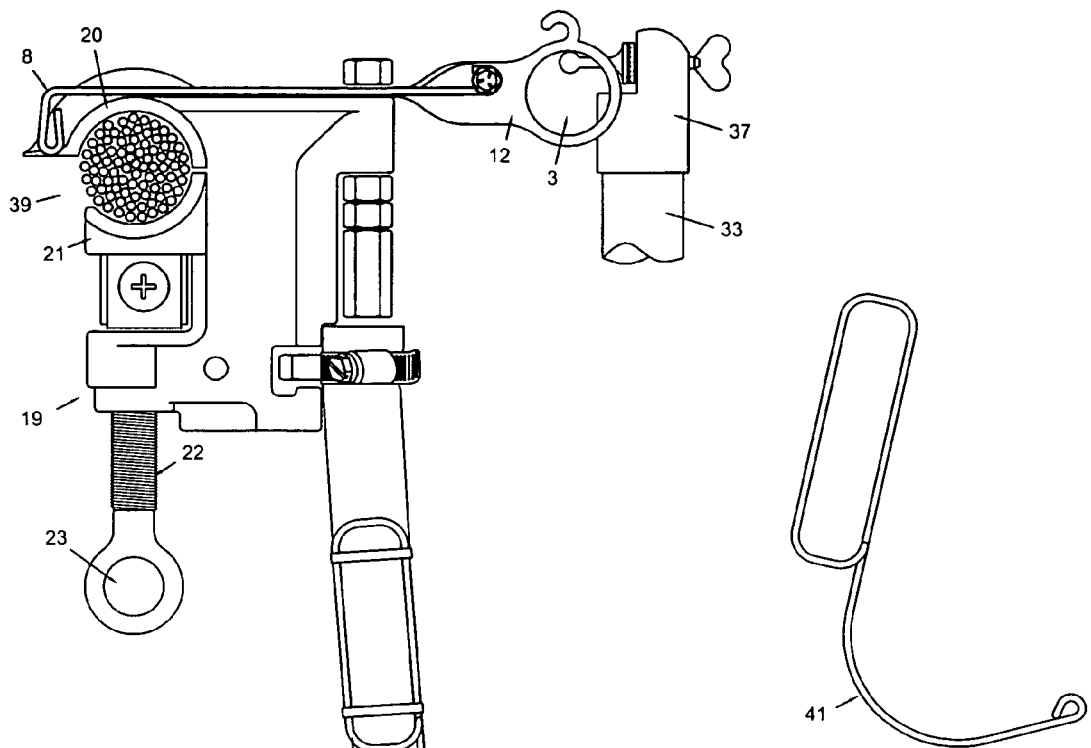
FIG. 14 is an isometric view of the second hook.

FIG. 14 shows an isometric view of second hook 41.

FIG. 15 shows a side view of clamp 19 positioned on power line 39. Anti-torque arm 8 engages power line 39. L hook 38 engages first aperture 3 of bracket assembly 12 which allows grounding set 17 (FIG. 7) to be lifted by the manipulating end 37 of extension stick 29. The other termination of a grounding set is also shown as clamp 19 hung on second hook 41 by way of first hook 40 at the top of first end 2.

Figure 16:
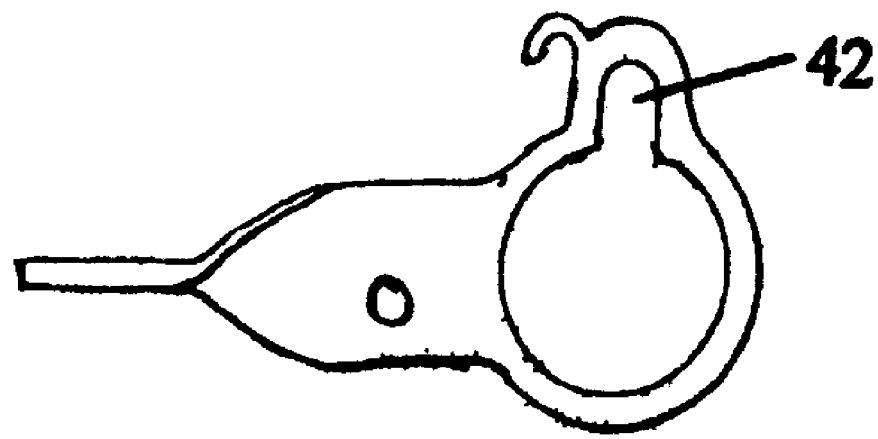
FIG. 16 shows a side view of another variation of the bracket body with a key hole slot in conjunction with the aperture.

FIG. 16 shows a side view of another embodiment of the bracket body with key hole slot 42 that engages the shank of L hook 38 (FIG. 12) and cooperates with the ball end of L hook 38 to provide greater control of clamp 19 (FIG. 13).

Figure 17:
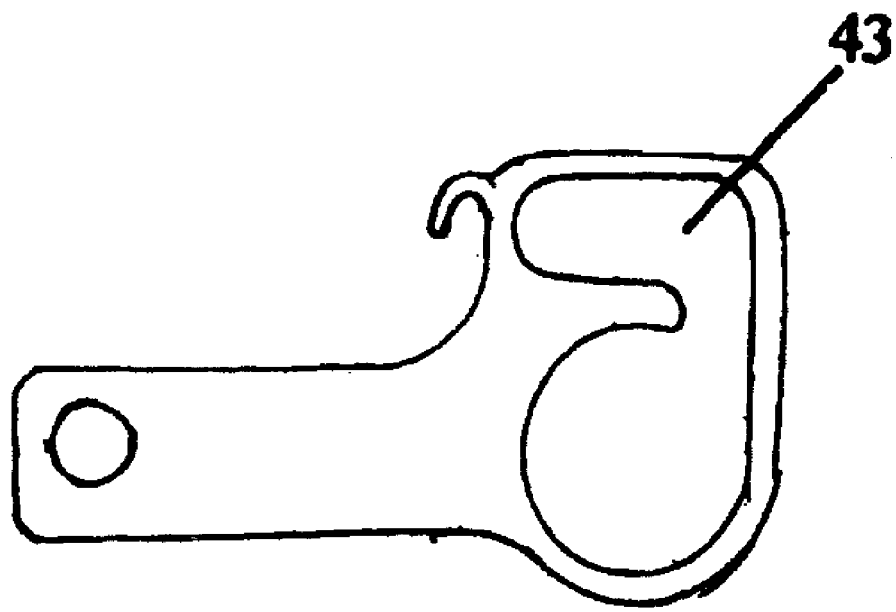
FIG. 17 shows a side view of another variation of the bracket body with a L shaped key hole slot in conjunction with the aperture.

FIG. 17 shows a side view of another embodiment of the bracket body with L slot 43 that engages the shank of L hook 38 (FIG. 12) and cooperates with the ball end of L hook 38 to provide greater control of clamp 19 (FIG. 13) and especially when a clamp utilized a spring jaw to engage a conductor by allowing a downward pull in the elongated porting of L slot 43.

The preferred embodiment of this invention has been portrayed in the description and drawings and is not intended as a limitation on other adaptations of this invention. Those skilled in the art can envision various adaptations of this invention to accommodate other conductor terminations both temporary and permanent which would benefit from the use of this invention.

I claim:

1. A conductivity means for accommodating a manipulating means for lifting and positioning and actuating its clamping means on target conductors, comprising:

a lifting ring defining a first aperture of a predetermined diameter generally larger than the working end diameter of said manipulating means for receiving said manipulating means;

a first rigid region radially extending from said lifting ring, said rigid region having a second aperture disposed there through, wherein said second aperture is adapted to receive a mounting means to rigidly attach said lifting ring to said clamping means;

said first rigid region proximate to the first aperture forms a first end and said first rigid region proximate to said second aperture forms a second end and the rigid region between said first end and second end forms a middle area;

a second rigid region radially extending from said first end, said middle area or said second end oriented on a pre-selected axis relative to a reference axis of a line from the center of said aperture one to the center of said aperture two generally forming a first hook with its opening external to said first end, said middle area or said second end, said first end, said middle area, said second end and said second rigid region forming a unitarily formed body;

a conducting set, further comprising;

at least one length of conductor;

at least one end termination with clamping means mounted on each end of said conductor conductive to each other through said conductor;

a rigid mounting means mounting said lifting ring to said end terminations; and at least one carrying means comprising;

a carrying bracket attached on and proximate to one end of each said conductor further comprising a second hook adapted to receive said first hook.

2. The conductivity means according to claim 1, wherein said body's middle area is generally parallel to said first end and said second end.

3. The conductivity means according to claim 1, wherein said body's middle area is formed to clock said first end a predetermined number of degrees relative to said second end generally on a reference axis of a line from the center of said aperture one to the center of said aperture two.

4. The conductivity means according to claim 1, wherein said body's middle area is formed to clock said first end a predetermined number of degrees relative to said second end generally on a first reference axis of a line from the center of said aperture one to the center of said aperture two; and said middle area is further formed a predetermined number of degrees generally on a second reference axis, generally in the center of said middle area and generally perpendicular to said first reference axis.

5. The conductivity means according to claim 1; wherein said conducting set consist of a of a hot line wire assembly.

6. The conductivity means according to claim 1; wherein said second rigid region further comprises a slot generally wider that the shank of said manipulating means and generally narrower than the enlarged end of said manipulating means in communication with said aperture.

7. The conductivity means according to claim 1; wherein said second rigid region further comprises a first slot in communication with a second slot at a predetermined angle relative to their respective centerlines generally wider that the shank of said manipulating means and generally narrower than the enlarged end of said manipulating means in communication with said aperture.

8. The conductivity means according to claim 1; where in said second end comprises the body of said end termination.

9. A conductivity means for accommodating a manipulating means for lifting and positioning and actuating its clamping means on target conductors and further providing stability to said clamping means to resist camming off said target conductor while actuating said clamping means, comprising:

a lifting ring defining a first aperture of a predetermined diameter generally larger than the working end diameter of said manipulating means for receiving said manipulating means;

a first rigid region radially extending from said lifting ring, said rigid region having a second aperture disposed there through, wherein said second aperture is adapted to receive a mounting means to rigidly attach said lifting ring to said clamping means;

said first rigid region proximate to the first aperture forms a first end and said first rigid region proximate to said second aperture forms a second end and the rigid region between said first end and second end forms a middle area;

a second rigid region radially extending from said first end, said middle area or said second end oriented on a pre-selected axis relative to a reference axis of a line from the center of said aperture one to the center of said aperture two generally forming a first hook with its opening external to said first end, said middle area or said second end, said first end, said middle area, said second end and said second rigid region forming a unitarily formed body;

an anti torque arm having a first end, a length and a second end;

said arm's first end is formed to accommodate rigid attachment to said body, said arm's second end is formed to engage said target conductor and said arm's length is generally curved to extend the said arm's second end away from said body and generally in line with and at predetermined distance from said clamping means; and said arm rigidly attached to said body between the first and second apertures generally proximate to said first aperture a conducting set, further comprising;

at least one length of conductor;

at least one end termination with clamping means mounted on each end of said conductor conductive to each other through said conductor;

a rigid mounting means mounting said lifting ring to said end terminations; and at least one carrying means comprising;

a carrying bracket attached on and proximate to one end of each said conductor further comprising a second hook adapted to receive said first hook.

10. The conductivity means according to claim 9, wherein said body's middle area is formed to clock said first end a predetermined number of degrees relative to said second end generally on a reference axis of a line from the center of said aperture one to the center of said aperture two.

11. The conductivity means according to claim 9, wherein said body's middle area is formed to clock said first end a predetermined number of degrees relative to said second end generally on a first reference axis of a line from the center of said aperture one to the center of said aperture two; and said middle area is further formed a predetermined number of degrees generally on a second reference axis, generally in the center of said middle area and generally perpendicular to said first reference axis.

12. The conductivity means according to claim 9, having at least a third aperture there through generally in said first end, wherein said aperture(s) is adapted to receive a mechanical fasting means to attach said arm.

13. The conductivity means according to claim 9, wherein said body and arm forming a unitary member.

14. The conductivity means according to claim 9; wherein said conducting set consist of a of a hot line wire assembly.

15. The conductivity means according to claim 9; wherein said second rigid region further comprises a slot generally wider that the shank of said manipulating means and generally narrower than the enlarged end of said manipulating means in communication with said aperture.

16. The conductivity means according to claim 9; wherein said second rigid region further comprises a first slot in communication with a second slot at a predetermined angle relative to their respective centerlines generally wider that the shank of said manipulating means and generally narrower than the enlarged end of said manipulating means in communication with said aperture.

17. The conductivity means according to claim 9; wherein said second end comprises the body of said end termination.

18. The method of attaching conductivity means that have lifting rings and carrying brackets onto target conductors comprising;

Step one—selecting an end termination with at least one proximate carrying bracket, engaging said first hook of a distal end termination onto said carrying bracket's second hook proximate to said selected end termination, repeat said step one for each length of conductor thereby allowing each successive distal end termination to be suspended proximate to a prior end termination;

Step two—extending and locking said manipulating means to a predetermined length, engaging said manipulating means onto the lifting ring of said selected end termination, lifting said conductivity means and positioning the clamping means of said selected end termination on a first target conductor, withdrawing said manipulating means from said lifting ring, and actuating the first selected clamping means onto said first target conductor;

Step three—engaging said manipulating means into a lifting ring of a successive clamping means, disengaging said first hook of said successive clamping means from said second hook, lifting and positioning and actuating said successive clamping means on a successive target conductor, repeating said step three for each additional conductor and target conductor, and step four—reversing said steps to remove said conductivity means from target conductors in a predetermined pattern.

* * * * *